(12) United States Patent
Faxér

(10) Patent No.: US 12,587,347 B2
(45) Date of Patent: ***Mar. 24, 2026

(54) PUCCH RESOURCE INDICATION FOR CSI AND HARQ FEEDBACK

(71) Applicant: TELEFONAKTIEBOLAGET LM ERICSSON (PUBL), Stockholm (SE)

(72) Inventor: Sebastian Faxér, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,154

(22) Filed: Jun. 27, 2023

(65) Prior Publication Data

US 2023/0421330 A1     Dec. 28, 2023

Related U.S. Application Data

(63) Continuation of application No. 16/753,091, filed as application No. PCT/IB2018/057654 on Oct. 2, 2018, now Pat. No. 11,689,338.

(Continued)

(51) Int. Cl.
| | |
|---|---|
| *H04W 4/00* | (2018.01) |
| *H04L 1/1812* | (2023.01) |
| *H04L 5/00* | (2006.01) |
| *H04W 24/10* | (2009.01) |
| *H04W 72/23* | (2023.01) |
| H04W 74/0833 | (2024.01) |

(52) U.S. Cl.
CPC .......... *H04L 5/0055* (2013.01); *H04L 1/1812* (2013.01); *H04W 24/10* (2013.01); *H04W 72/23* (2023.01); *H04W 74/0833* (2013.01)

(58) Field of Classification Search
None
See application file for complete search history.

(56) References Cited

U.S. PATENT DOCUMENTS

2012/0257552 A1    10/2012    Chen
2014/0293843 A1*   10/2014    Papasakellariou .... H04L 5/0037
                                                          370/280

(Continued)

FOREIGN PATENT DOCUMENTS

CN          101946539 A          1/2011
CN          104823389 A          8/2015

(Continued)

OTHER PUBLICATIONS

Ericsson, DL multi-TRP and multi-panel transmission, 3GPP TSG-RAN WG1 Meeting #90, R1-1714275, Prague, Czech Republic, Aug. 21-25, 2017.

(Continued)

*Primary Examiner* — Bob A Phunkulh
(74) *Attorney, Agent, or Firm* — Ericsson Inc.

(57)          ABSTRACT

Systems and methods for triggering CSI reporting on PUCCH are described herein. A network node transmits a downlink-related control message including a Channel State Information (CSI) request field and a Physical Uplink Control Channel (PUCCH) resource indicator. A wireless device receives the control message and determines to trigger a CSI report in accordance with the CSI request field and the PUCCH resource indicator.

23 Claims, 8 Drawing Sheets

Related U.S. Application Data

(60) Provisional application No. 62/567,025, filed on Oct. 2, 2017.

(56) References Cited

U.S. PATENT DOCUMENTS

| | | | |
|---|---|---|---|
| 2015/0092646 A1 | 4/2015 | Tabet | |
| 2015/0092692 A1* | 4/2015 | Kim | H04L 5/0016 |
| | | | 370/329 |
| 2015/0349866 A1 | 12/2015 | Benjebbour | |
| 2015/0358827 A1 | 12/2015 | Bendlin | |
| 2016/0100422 A1* | 4/2016 | Papasakellariou | H04L 1/1822 |
| | | | 370/329 |
| 2017/0366377 A1* | 12/2017 | Papasakellariou | H04L 5/0053 |
| 2017/0367046 A1* | 12/2017 | Papasakellariou | H04L 5/0048 |
| 2017/0374658 A1 | 12/2017 | Kim | |
| 2017/0374661 A1 | 12/2017 | Aiba | |
| 2018/0019853 A1 | 1/2018 | Aiba | |
| 2018/0020429 A1 | 1/2018 | Aiba | |
| 2018/0020430 A1 | 1/2018 | Aiba | |
| 2018/0124773 A1 | 5/2018 | Lee | |
| 2018/0192414 A1 | 7/2018 | Takahashi | |
| 2018/0198568 A1 | 7/2018 | Takeda | |
| 2019/0058544 A1 | 2/2019 | Beale | |
| 2019/0200359 A1 | 6/2019 | Choi | |
| 2019/0253193 A1 | 8/2019 | Kim | |
| 2019/0297601 A1 | 9/2019 | You | |
| 2019/0297602 A1 | 9/2019 | You | |
| 2019/0342061 A1 | 11/2019 | Kim | |
| 2020/0204221 A1 | 6/2020 | Tong | |
| 2020/0221444 A1 | 7/2020 | Tiirola | |
| 2020/0295903 A1 | 9/2020 | Faxér | |
| 2020/0374866 A1 | 11/2020 | Takeda | |
| 2022/0232608 A1 | 7/2022 | Kim | |

FOREIGN PATENT DOCUMENTS

| | | |
|---|---|---|
| CN | 107078857 A | 8/2017 |
| JP | 2013135247 A | 7/2013 |
| WO | 2012173445 A2 | 12/2012 |
| WO | 2014110745 A1 | 7/2014 |
| WO | 2016123372 A1 | 8/2016 |
| WO | 2016164739 A1 | 10/2016 |
| WO | 2017006826 A1 | 1/2017 |

OTHER PUBLICATIONS

Ericsson, Triggered A-CSI on PUCCH, 3GPP TSG-RAN WG1 Meeting #94bis, R1-1810318, Oct. 8-12, 2018, Chengdu, China.

Huawei, Aperiodic CSI feedback on PUCCH in NR, R1-1800829, 3GPP TSG RAN WG1 Ad Hoc Meeting, Jan. 22-26, 2018, Vancouver, Canada.

LG Electronics, Discussion on NR-PUCCH allocation for CSI reporting, 3GPP TSG RAN WG1 Meeting #89, R1-1707646, May 15-19, 2017, Hangzhou, China.

Nokia et al., On DCI formats, DCI content and the configurability of DCI fields in NR, 3GPP TSG RAN WG1 NRAH#3, R1-1715752, Nagoya, Japan Sep. 18-21, 2017.

R1-1611639 3GPP TSG RAN WG1 #87, Nov. 14-18, 2016 Reno, USA Qualcomm Incorporated "Uplink Control Channel Design for Shortened TTI".

* cited by examiner

510. Receive a control message

520. Determine to trigger at least one CSI report

530. Transmit uplink control information

PUCCH RESOURCE INDICATION FOR CSI AND HARQ FEEDBACK

CROSS REFERENCE TO RELATED APPLICATIONS

This application is a continuation of U.S. application Ser. No. 16/753,091, which is a 35 U.S.C. § 371 national phase filing of International Application No. PCT/IB2018/057654, filed Oct. 2, 2018, which claims the benefit of U.S. Provisional Application No. 62/567,025 filed on Oct. 2, 2017, each of which is incorporated by reference herein in its entirety.

TECHNICAL FIELD

The present disclosure generally relates to wireless communications and wireless communication networks.

INTRODUCTION

The architecture for New Radio (NR) (also known as 5G or Next Generation) is being discussed in standardization bodies such as 3GPP. The NR networks will support a diverse set of use cases and a diverse set of deployment scenarios. The later includes deployment at both low frequencies (e.g. 100s of MHz), similar to LTE today, and very high frequencies (e.g. mm waves in the tens of GHz).

Similar to LTE, NR will use OFDM in the downlink (i.e. from a network node, gNB, eNB, or base station, to a user equipment or UE). In the uplink (i.e. from UE to gNB), both DFT-spread OFDM and OFDM will be supported.

The basic NR physical resource can thus be considered as a time-frequency grid similar to the one in LTE, illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values can be supported in NR. The supported subcarrier spacing values (also referred to as different numerologies) in NR are given by $\Delta f=(15 \times 2^{\alpha})$ kHz where a is a non-negative integer.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency but for further study in time domain.

In the time domain, downlink and uplink transmissions in NR will be organized into equally-sized subframes, similar to LTE, as shown in FIG. 2. In NR, subframe length for a reference numerology of $(15 \times 2^{\alpha})$ kHz is exactly $\frac{1}{2}^{\alpha}$ ms.

The control information associated with the UE accessing the network can be broadcast by a network node (e.g. gNB). Some uncertainty may exist between the UE and the network related to the delivery of this control information.

SUMMARY

It is an object of the present disclosure to obviate or mitigate at least one disadvantage of the prior art.

Systems and methods for dynamic PUCCH resource allocation for CSI feedback are provided herein.

In a first aspect of the present disclosure, there is provided a method performed by a wireless device. The wireless device can comprise a radio interface and processing circuitry configured to perform the method. The method includes receiving, on a Physical Downlink Control Channel (PDCCH), a downlink-related Downlink Control Information (DCI) message. The wireless device determines to trigger a Channel State Information (CSI) report in accordance with a CSI request field in the downlink-related DCI message. The wireless device determines a Physical Uplink Control Channel (PUCCH) resource for the triggered CSI report in accordance with a PUCCH resource indicator in the downlink-related DCI message. The wireless device transmits the CSI report on the determined PUCCH resource.

In some embodiments, the downlink-related DCI message includes a CSI request field indicating whether to trigger CSI feedback on the PUCCH.

In some embodiments, the downlink-related DCI message includes a grant to schedule a Physical Downlink Shared Channel (PDSCH) transmission. The PUCCH resource for the triggered CSI report can be determined further in accordance with the grant to schedule PDSCH transmission.

In some embodiments, the wireless device can obtain configuration information associated with interpreting the PUCCH resource indicator.

In some embodiments, determining the PUCCH resource can comprise at least one of determining a first PUCCH resource responsive to a CSI request being indicated in the downlink-related DCI message; and determining a second PUCCH resource responsive to a CSI request being not indicated in the downlink-related DCI message. The first PUCCH resource can be different from the second PUUCH resource. In some embodiments, determining the PUCCH resource can further comprises determining at least a third PUCCH resource responsive to both a CSI request being indicated and a downlink grant being included in the downlink DCI message.

In some embodiments, the CSI report can be multiplexed with a Hybrid Automatic Repeat Request Acknowledgement (HARQ-ACK) on the determined PUCCH resource. In some embodiments, the CSI report and a HARQ-ACK can be transmitted on different PUCCH resources. The HARQ-ACK can be scheduled by the downlink-related DCI. A HARQ-ACK resource can be determined in accordance with the PUCCH resource indicator.

In another aspect of the present disclosure, there is provided a method performed by a network node. The network node can comprise a radio interface and processing circuitry configured to perform the method. The method includes generating a downlink-related Downlink Control Information (DCI) message including a Channel State Information (CSI) request field and a Physical Uplink Control Channel (PUCCH) resource indicator. The network node transmits, on a Physical Downlink Control Channel (PDCCH), the generated downlink-related DCI message. The network node receives a CSI report on a PUCCH resource in accordance with the downlink-related DCI message.

In some embodiments, the CSI request field indicates whether to trigger CSI feedback on the PUCCH.

In some embodiments, the downlink-related DCI message can further include a grant to schedule a Physical Downlink Shared Channel (PDSCH) transmission.

In some embodiments, the PUCCH resource indicator can include at least a first field indicating a first PUCCH resource to use when a CSI request is indicated in the downlink-related DCI message, and a second field indicating a second PUCCH resource to use when a CSI request is not indicated in the downlink-related DCI message. The first PUCCH resource can be different from the second PUUCH resource.

In some embodiments, the PUCCH resource indicator can include a third field indicating at least a third PUCCH resource to use when both a CSI request is indicated and a downlink grant is included in the downlink DCI message.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
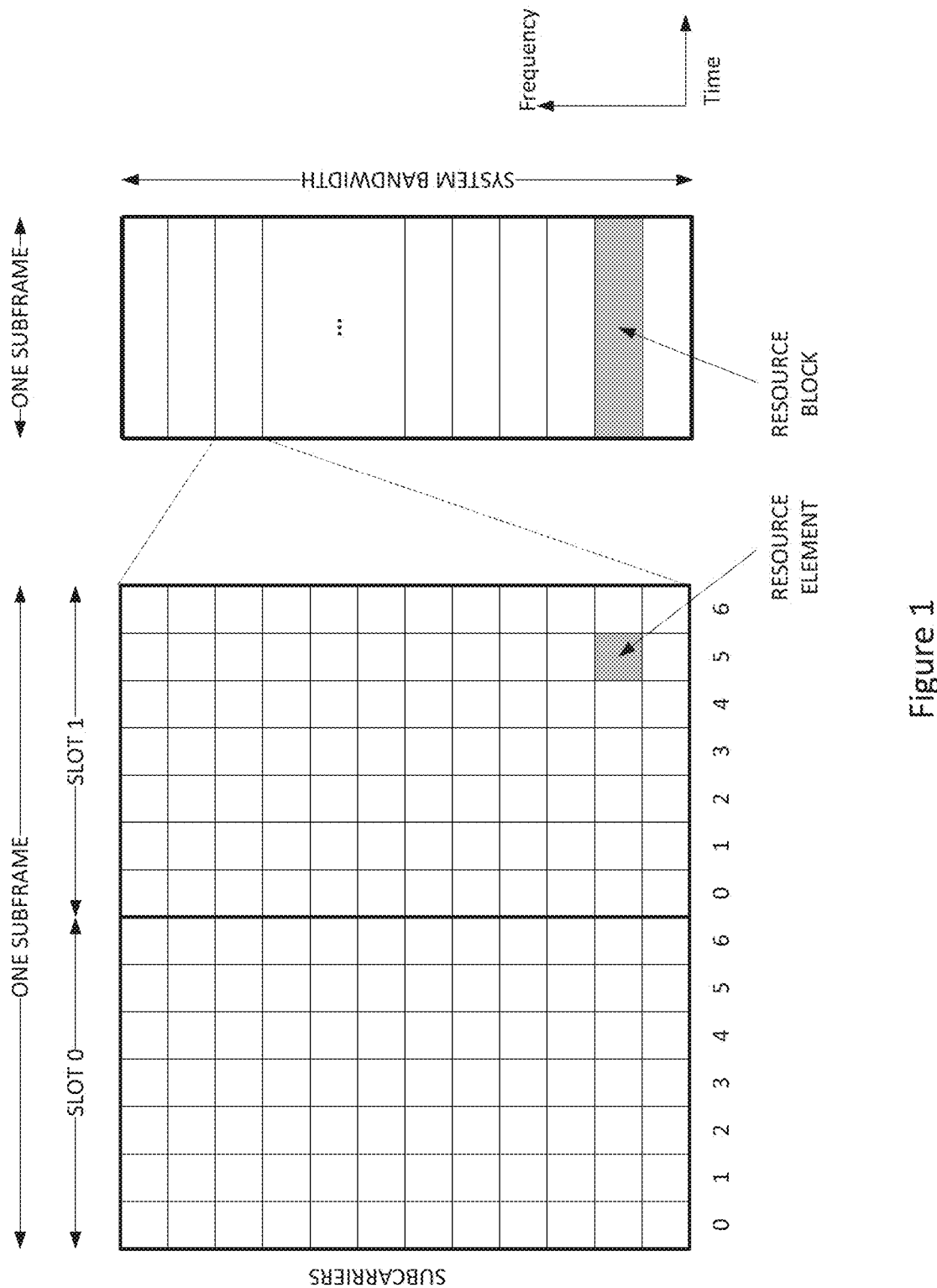
FIG. 1 illustrates an example of LTE physical resources.
Figure 2:
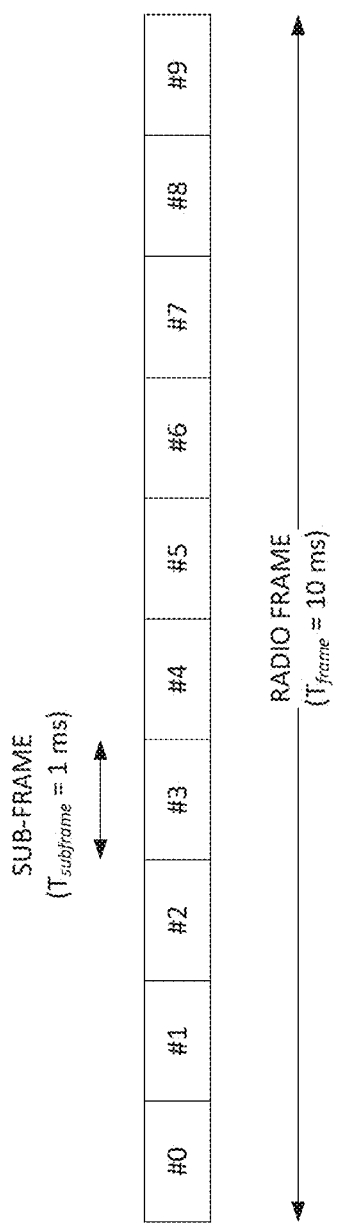
FIG. 2 illustrates an example of LTE time-domain structure.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 7.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, gNB network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 9.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a UE or a network node.

In some embodiments, a UE can be configured to operate in carrier aggregation (CA) implying aggregation of two or more carriers in at least one of DL and UL directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different TPs of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 3:
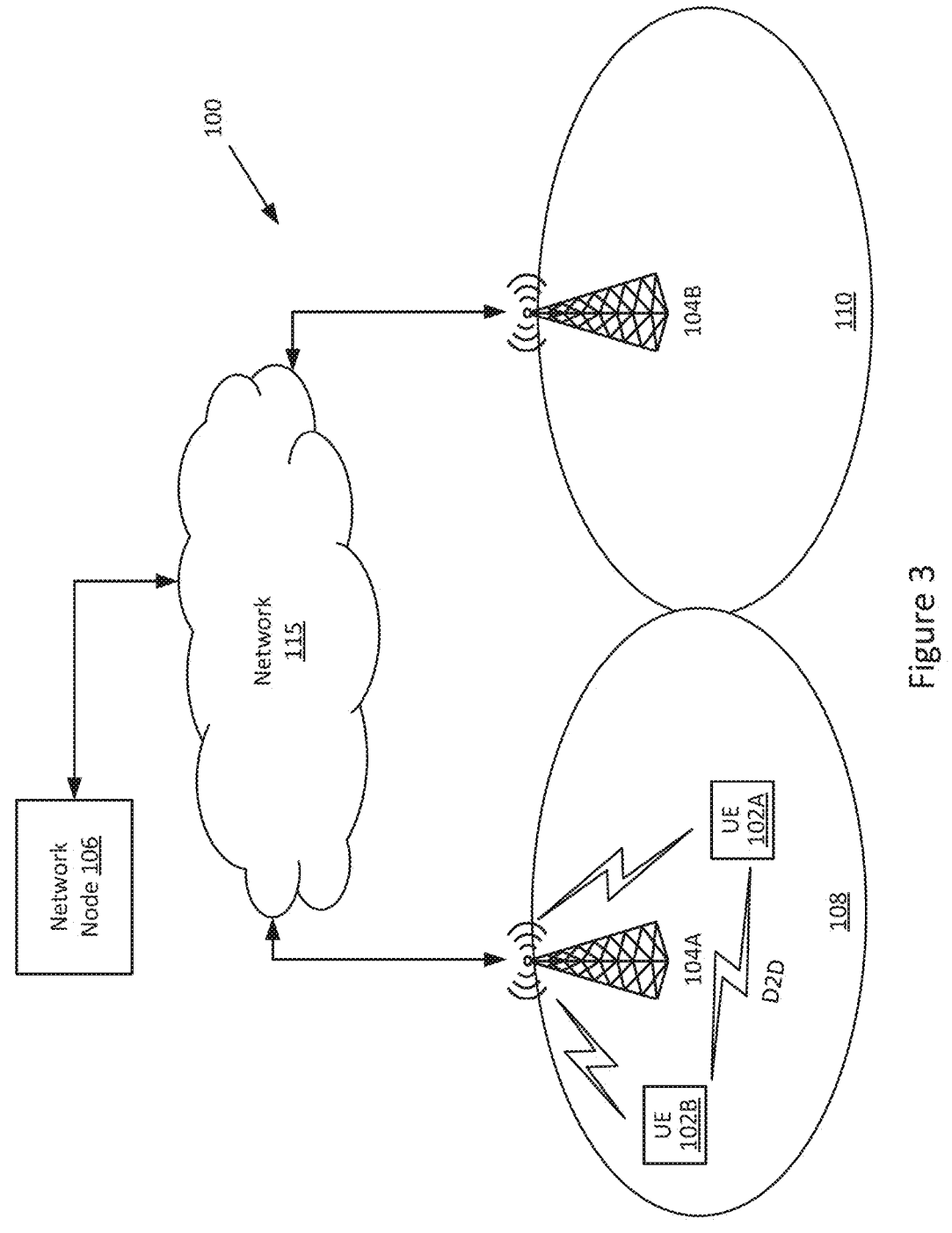
FIG. 3 illustrates an example wireless network.

FIG. 3 illustrates an example of a wireless network 100 that can be used for wireless communications. Wireless network 100 includes UEs 102A-102B and a plurality of network nodes, such as radio access nodes 104A-104B (e.g. eNBs, gNBs, etc.) connected to one or more network nodes 106 via an interconnecting network 115. The network 100 can use any suitable deployment scenarios. UEs 102 within coverage area 108 can each be capable of communicating directly with radio access node 104A over a wireless interface. In some embodiments, UEs 102 can also be capable of communicating with each other via D2D communication.

As an example, UE 102A can communicate with radio access node 104A over a wireless interface. That is, UE 102A can transmit wireless signals to and/or receive wireless signals from radio access node 104A. The wireless signals can contain voice traffic, data traffic, control signals, and/or any other suitable information. In some embodiments, an area of wireless signal coverage associated with a radio access node 104A can be referred to as a cell 108.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

As discussed, system information including the control information required for a UE 102 to access the cell 108, is periodically broadcast by the radio access node(s) 104. Some uncertainty may exist between the UE 102 and the network related to the delivery of this system information.

Downlink transmissions are dynamically scheduled, i.e., in each subframe the gNB transmits downlink control information (DCI) about which UE data is to be transmitted to and which resource blocks in the current downlink subframe the data will be transmitted on. This control signaling is typically transmitted in the first one or two OFDM symbols in each subframe in NR. The control information is carried on Physical Control Channel (PDCCH) and data is carried on Physical Downlink Shared Channel (PDSCH). A UE first detects and decodes PDCCH and if a PDCCH is decoded successfully, it the decodes the corresponding PDSCH based on the decoded control information in the PDCCH.

Uplink data transmission are also dynamically scheduled using PDCCH. Similar to the downlink, a UE first decodes uplink grants in PDCCH and then transmits data over the Physical Uplink Shared Channel (PUSCH) based the decoded control information in the uplink grant such as modulation order, coding rate, uplink resource allocation, and etc.

In addition to PUSCH, the Physical Uplink Control Channel (PUCCH) is also supported in NR to carry uplink control information (UCI) such as HARQ (Hybrid Automatic Repeat Request) related Acknowledgement (ACK), Negative Acknowledgement (NACK), or Channel State Information (CSI) feedback.

NR supports carrier aggregation of up to 32 component carriers (CCs) in the downlink. Each CC acts as a cell and one of them is a primary cell or carrier. Only the primary carrier may have an associated uplink carrier. In this case, ACK/NACK, SR, and CSI for each downlink component carrier are aggregated and transmitted on the single uplink carrier. The aggregated UCI payload size thus can be quite large.

The main content of a DL-related DCI is the DL grant, which schedules a PDSCH transmission. The DL grant comprises information indicating which frequency-domain resources the PDSCH a UE is scheduled with occupies, the modulation and coding scheme (MCS) is used, HARQ-related information such as redundancy version (RV), New Data Indicator (NDI) and HARQ process number. It may also comprise multi-antenna related information, such as the number of layers in the PDSCH and which DMRS antenna ports are used. It has also been agreed that a PUCCH resource indicator is present in the DCI. The PUCCH resource indicator conventionally indicates which time/frequency/code PUCCH resource the UE shall transmit the HARQ-ACK for the scheduled PDSCH. Two (2) bits can be used for the PUCCH resource indication field, and each codepoint will indicate one out of four higher layers configured PUCCH resources (in terms of frequency-location, slot offset, etc.).

Also included in the DL-related DCI is an SRS request field, which can trigger transmission of one or more SRS resources in the uplink.

In LTE and likely also for NR, it is possible to transmit a DL-related DCI without an DL grant by indicating that all the codewords (CWs) are turned off. In LTE, this is done by indicating MCS=0 and RV=1 for all the CWs. Similar methods can also be employed for NR. Thus, it may be possible to transmit a DL-related DCI with an SRS triggering request only, without also scheduling PDSCH.

A description of the conventional fields in a DL-related DCI, according to RAN1 discussion, is given in Table 1.

TABLE 1

| DL-related DCI fields | | | |
|---|---|---|---|
| Information | | Bits | Description |
| Resource info | Carrier indicator | 3 | for cross-carrier scheduling |
| | Frequency-domain PDSCH resources-PRBs | | Resources in the frequency domain |
| | Time domain PDSCH resources | | Resources in the time domain, including cross-slot scheduling |
| | PDSCH/PDCCH resource sharing | | Indicates whether the PDSCH is mapped to the semi-statically configured resource sets or not. |
| | Bundling size | 1 | Indicate the PRB bundling size |
| MCS | MCS | | Modulation and coding scheme per TB. Multiple entries if we have multiple TBs for spatial multiplexing. TB size can be derived from MCS and resource allocation. |
| CBG and HARQ-related info | New data indicator | 1 or 2 | For one TB, multiple bits if we have multiple TBs |
| | Redundancy version | 2 | |
| | HARQ process number. | 3 or 4 | HARQ process number |
| | CBGFI | | CBG flush indication. Consists of 1 bit (for one CW) if configured. |
| | CBGTI | | Indicates the CBG(s) (re)transmitted. Consists of N bits bitmap if CBG is configured. |
| PUCCH-related | PUCCH power control | | |
| | PUCCH resource indicator | | Indicates the PUCCH time and frequency resource to use for hybrid ARQ ACK |
| Multi-antenna | Antenna port(s) number of layers | | The antenna ports to receive The number of layers to receive |

TABLE 1-continued

| DL-related DCI fields | | | |
|---|---|---|---|
| Information | | Bits | Description |
| related information | QCL indication | | Beam indication to indicate QCL assumption between DL RS antenna port(s) and DMRS antenna port(s) of DL data channel at least w.r.t. spatial QCL parameter |
| SRS-related information | SRS triggering request | | To trigger an SRS transmission in the uplink. |
| RNTI | RNTI | | Identity of the UE (or group of UEs) |

Similar to how the DL-related DCI may comprise an DL grant scheduling PDSCH, the UL-related DCI may comprise a UL grant scheduling a PUSCH transmission for a UE. Many of the fields are similar between DL and UL related DCI. For instance, UL-related DCI comprises information about the physical time-frequency resources the UE shall use for the PUSCH transmission, MSC, HARQ-related information, multi-antenna related information, and so forth. The UL-related DCI also contains a CSI report triggering request field, which can trigger an aperiodic CSI report. This field is present in UL-related DCI as the aperiodic CSI report typically is carried on PUSCH together with the scheduled UL-SCH. A description of the conventional fields in a UL-related DCI, according to RAN1 agreements, is given in Table 2.

TABLE 2

| UL-related DCI fields | | | |
|---|---|---|---|
| Resource info | Carrier indicator | 3 | for cross-carrier scheduling |
| | Frequency-domain PUSCH resources-PRBs | | Resources in the frequency domain |
| | Time domain PUSCH resources | | Resources in the time domain, including cross-slot scheduling |
| MCS | MCS | | Modulation and coding scheme per TB. Multiple entries if we have multiple TBs for spatial multiplexing from one transmission point. TB size can be derived from MCS and resource allocation. |
| CBG and HARQ-related info | New data indicator | 1 | For one TB |
| | Redundancy version | 2 | For one TB |
| | HARQ process number. | 3 or 4 | HARQ process number |
| | CBGTI | | Indicates the CBG(s) to (re)transmitted. Consists of N bits bitmap if CBG is configured. |
| Power control | PUSCH power control | | |
| Multi-antenna related information | SRS resource indicator (SRI) | | To indicate a reference SRS resource(s) from a previous bundle of transmitted SRS resources. The UE should use the precoder on the indicated reference SRS resource(s) for PUSCH. FFS if subband SRI is supported. |
| | TPMI | | To select a transmit precoding matrix from the UL codebook |
| | Transmission | | |

TABLE 2-continued

| | UL-related DCI fields | |
|---|---|---|
| | Rank Indicator Antenna port(s), scrambling identity (FFS) and number of layers | |
| CSI-related information | CSI report triggering request, | To trigger a CSI report |
| | CSI measurement request | CSI-RS indication (incl IMR) |
| SRS-related | SRS triggering request | To trigger an SRS transmission in the uplink. |
| RNTI | RNTI | Identity of the UE (or group of UEs) |

In LTE and likely in NR, each codepoint of the CSI request field points to a higher layer configured "CSI report set", which can comprise multiple CSI Report Settings for one or multiple cells, implying that multiple CSI reports may be triggered simultaneously. This is illustrated in Table 3 below.

TABLE 3

Example of interpretation of CSI report triggering request field

| Value of CSI request field | Description |
|---|---|
| '00' | No aperiodic CSI report is triggered |
| '01' | Aperiodic CSI report is triggered for $1^{st}$ CSI report set configured by higher layers |
| '10' | Aperiodic CSI report is triggered for a $2^{nd}$ CSI report set configured by higher layers |
| '11' | Aperiodic CSI report is triggered for a $3^{rd}$ CSI report set configured by higher layers |

In NR, a UE can be configured with N≥1 CSI reporting settings, M≥1 Resource settings, and 1 CSI measurement setting, where the CSI measurement setting includes L≥1 links and value of L may depend on the UE capability. At least the following configuration parameters are signaled via RRC at least for CSI acquisition.

N, M, and L are indicated either implicitly or explicitly.

In each CSI reporting setting, at least: reported CSI parameter(s), CSI Type (I or II) if reported, codebook configuration including codebook subset restriction, time-domain behavior, frequency granularity for CQI and PMI, measurement restriction configurations.

In each Resource setting:

A configuration of S≥1 CSI-RS resource set(s)

A configuration of $K_s$≥1 CSI-RS resources for each set s, including at least: mapping to REs, the number of ports, time-domain behavior, etc.

Time domain behavior: aperiodic, periodic or semi-persistent

RS type which encompasses at least CSI-RS

In each of the L links in CSI measurement setting: CSI reporting setting indication, Resource setting indication, quantity to be measured (either channel or interference)

One CSI reporting setting can be linked with one or multiple Resource settings

Multiple CSI reporting settings can be linked

At least, the following are dynamically selected by L1 or L2 signaling, if applicable:

One or multiple CSI reporting settings within the CSI measurement setting

One or multiple CSI-RS resource sets selected from at least one Resource setting One or multiple CSI-RS resources selected from at least one CSI-RS resource set In LTE, UEs can be configured to report CSI in periodic or aperiodic reporting modes. Periodic CSI reporting is carried on PUCCH while aperiodic CSI is carried on PUSCH. PUCCH is transmitted in a fixed or configured number of PRBs and using a single spatial layer with QPSK modulation. PUSCH resources carrying aperiodic CSI reporting are dynamically allocated through uplink grants carried over PDCCH or enhanced PDCCH (EPDCCH), and can occupy a variable number of PRBs, use modulation states such as QPSK, 16QAM, and 64 QAM, as well as multiple spatial layers.

In NR, in addition to periodic and aperiodic CSI reporting as in LTE, semi-persistent CSI reporting can also be supported.

Thus, three types of CSI reporting can be supported in NR as follows:

Periodic CSI Reporting: CSI is reported periodically by the UE. Parameters such as periodicity and subframe offset are configured semi-statically, by higher layer signaling from the gNB to the UE.

Aperiodic CSI Reporting: This type of CSI reporting involves a single-shot (i.e., one time) CSI report by the UE which is dynamically triggered by the gNB, e.g. by the DCI in PDCCH. Some of the parameters related to the configuration of the aperiodic CSI report is semi-statically configured from the gNB to the UE but the triggering is dynamic.

Semi-Persistent CSI Reporting: Similar to periodic CSI reporting, semi-persistent CSI reporting has a periodicity and subframe offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports.

Furthermore, NR can support two types of aperiodic CSI reporting, in addition to the PUSCH-based aperiodic CSI reporting supported by LTE, NR also supports aperiodic CSI reporting on PUCCH (at least for short PUCCH).

Given that NR can support aperiodic CSI reporting on PUCCH, in addition to aperiodic CSI reporting on PUSCH, and also semi-persistent CSI reporting on either of PUSCH and PUCCH, efficient dynamic triggering of CSI reports on PUCCH is required.

In some embodiments, a CSI request field can be introduced in DL-related DCI to support triggering of CSI reports on PUCCH (e.g., the CSI request field can be in addition to the fields shown in Table 1). The already existing PUCCH resource indication field (previously only used for indication of PUCCH resource for HARQ-ACK) can be reused for indication of PUCCH resource for CSI feedback/report.

In some embodiments, the PUCCH resource indication field can be interpreted differently depending on if a DL grant and/or a CSI request is present in the DL-related DCI.

Accordingly, dynamic PUCCH resource allocation for aperiodic CSI feedback can be achieved without increasing the DCI overhead, enabling increased scheduling flexibility and larger multi-user capacity.

One possible benefit to supporting aperiodic CSI reporting on short PUCCH is to allow for more scheduling flexibility, as even WB CSIs can be triggered aperiodically, and it can be wasteful to spend an entire PUSCH transmission (spanning multiple OFDM symbols) if only transmitting a couple of 10 bits of WB CSI. Another motivation is to allow for same-slot CSI feedback where the DCI containing the aperiodic CSI request trigger is received in the beginning of a slot and the CSI feedback is transmitted on a short PUCCH at the end of the slot.

In some embodiments discussed herein, aperiodic CSI (A-CSI) reports are triggered with DCI by indicating which CSI report(s) shall be reported in the CSI request field.

Conventionally, the CSI request field is present in UL-related DCI, as the CSI report in that case is multiplexed with UL-SCH on PUSCH and the UL-related DCI contains the PUSCH resource allocation. However, when an A-CSI report is transmitted on PUCCH, a CSI request field can be included in the DL-related DCI. First, for the case of same-slot CSI reporting, the UE is likely being scheduled with PDSCH in the same slot as it is triggered with an immediate CSI report (otherwise, there is no benefit with immediate reporting). Thus, if the CSI request field is not present in the DL-related DCI containing the DL grant, both a UL-related DCI and a DL-related DCI would need to be transmitted in the same slot. Second, the DL-related DCI already contains a PUCCH resource indicator field for HARQ-ACK, indicating the timing offset and frequency/code location of the PUCCH containing ACK/NACK.

In some embodiments, this field can be re-used for indicating the PUCCH resource to be used when transmitting the A-CSI report.

In one embodiment, the A-CSI report is always piggybacked on the same PUCCH that is used to transmit the HARQ-ACK. That is, the HARQ-ACK bits and the A-CSI bits are bundled and multiplexed to the same PUCCH resource that is indicated in the PUCCH resource indication field in DCI. While this embodiment can simplify UE implementation and reduce specification complexity, it may limit flexibility of the gNB. It may also be wasteful in terms of UL resources. As HARQ-ACK is only a few bits, while WB CSI can be in the order of 20 bits, different frequency-allocations and/or PUCCH formats could be required depending on if "HARQ-ACK only" or "HARQ-ACK+ CSI" are multiplexed in the PUCCH.

It could potentially be beneficial to transmit the HARQ-ACK and CSI that was triggered with the same DCI on different PUCCH resources. For example, a CSI report with many antenna ports could be triggered, requiring some CSI process delay by the UE so that the CSI report is transmitted in, for example, slot n+2, while the ACK/NACK could be transmitted in slot n. Thus, it may be beneficial to indicate different PUCCH timing offsets for CSI and ACK/NACK. It may also be beneficial if such flexibility can be introduced without increasing DCI overhead.

Therefore, in some embodiments, the PUCCH resource indicator field can be interpreted differently depending on the presence of a DL grant (i.e. if a PDSCH is scheduled by the DCI or if all the CWs are turned off) and/or the presence of a CSI request in the DCI (i.e. if one or more CSI report is triggered or if triggering state 00 is indicated, meaning that no CSI report is triggered).

An example of one such embodiment is illustrated in Table 4 below. In this example, if bits 00 are indicated in the PUCCH resource indicator field, PUCCH resource #1 is used if the DCI contains DL grant only and not a CSI request while PUCCH resource #3 is used if DCI contains CSI request only and no DL grant. If DCI contains both DL grant and CSI request, PUCCH resource #7 is used. Further in the example, if bits 10 are indicated, PUCCH resource #3 is used for HARQ-ACK and PUCCH resource #2 is used for CSI, if both are triggered simultaneously, separate PUCCH resources are used for the respective transmissions.

TABLE 4

Example of interpreting the PUCCH resource indicator field based on DL-related DCI

| PUCCH resource indicator bitfield | HARQ-ACK only | CSI only | HARQ-ACK + CSI |
|---|---|---|---|
| 00 | PUCCH resource #1 | PUCCH resource #3 | PUCCH resource #7 |
| 01 | PUCCH resource #2 | PUCCH resource #5 | PUCCH resource #8 |
| 10 | PUCCH resource #3 | PUCCH resource #2 | {PUCCH resource #3, PUCCH resource #2} |
| 11 | PUCCH resource #4 | PUCCH resource #6 | {PUCCH resource #4, PUCCH resource #6} |

In some embodiments, the higher layer configuration of a PUCCH resource indicator triggering state (i.e. trigger00, trigger01, . . . ) can comprise two or more information fields. Each information field can comprise a reference to a separate PUCCH resource. Which information field (i.e. which PUCCH resource) a UE shall use depends on if the DCI comprises a CSI request trigger or not. In some embodiments, the configuration of the trigger state can comprise two information fields: a first field that shall be used when CSI request is present and a second field that shall be used when CSI request trigger is not present in DCI.

In other embodiments, three information fields can be used: a first field that shall be used when only DL grant is present, a second field that shall be used when DL grant is not present but CSI request trigger is present, and a third field that shall be used when both DL grant and CSI request is present. In some such embodiments, the information field that shall be used when both DL grant and CSI request is present in DCI comprises two PUCCH resources, a first and a second. The first PUCCH resource shall be used for transmitting HARQ-ACK while the second PUCCH resource shall be used for transmitting CSI.

It will be appreciated by those skilled in the art that the embodiments herein have discussed with respect to aperiodic CSI feedback on PUCCH, but may equally well be applied for semi-persistent CSI feedback on PUCCH, when triggered by a DCI. In such a case, the PUCCH resource to use for the semi-persistent CSI feedback can be indicated in the PUCCH resource indicator field. In some such embodiments, only frequency and code resources for the PUCCH are indicated while the periodicity and slot offset for the semi-persistent CSI report can be semi-statically configured with another higher layer parameter. In other embodiments, the slot offset can also be indicated.

Figure 4:
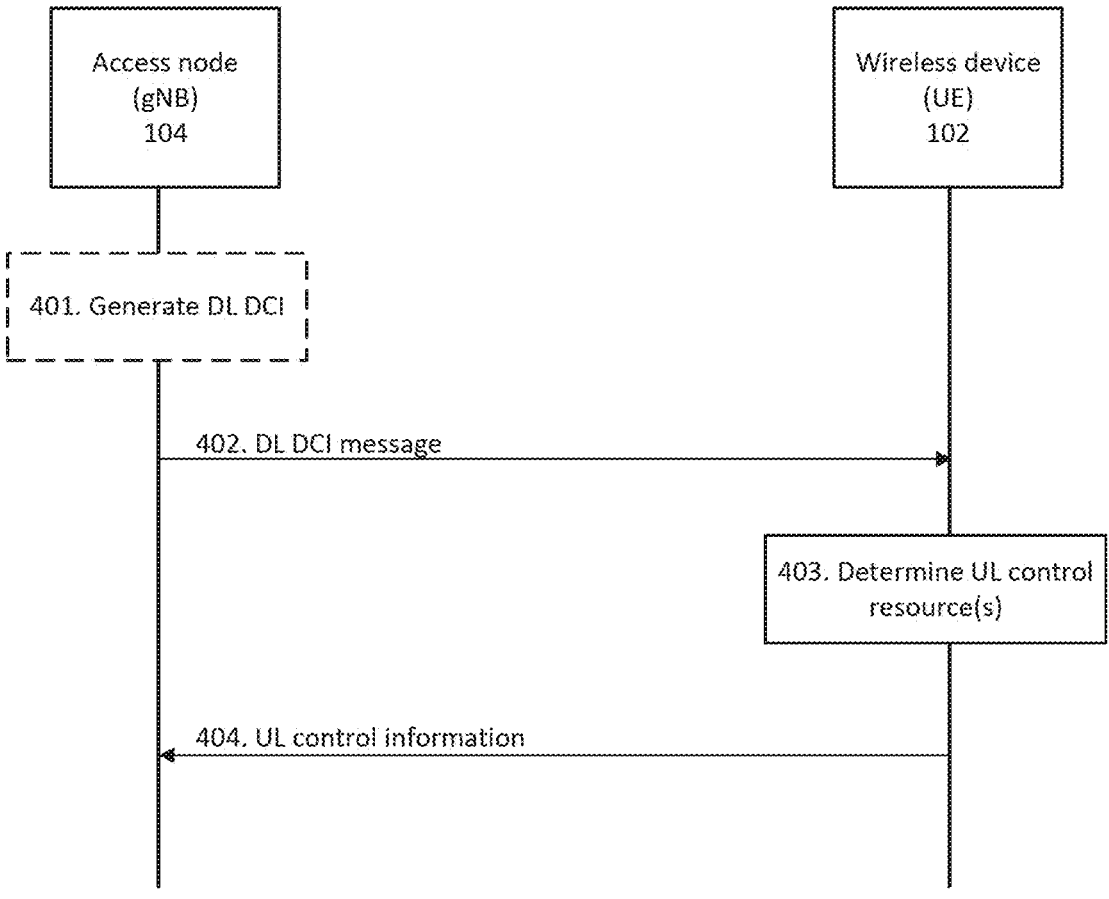
FIG. 4 illustrates an example signaling diagram.

FIG. 4 is an example signaling diagram. An access node, such as gNB 104, can generate parameters for a control message, such as a downlink DCI message (step 401). In some embodiments, this can include adding a CSI request field to indicate to a wireless device to trigger at least one CSI report. This can further include using a PUCCH resource indication field to indicate, to the wireless device, PUCCH resource(s) for said CSI report(s). Access node 104 transmits the configured control message (e.g. downlink DCI) to the wireless device 102 (step 402). Wireless device 102 can determine uplink control resource(s) in accordance with the received downlink DCI message (step 403). In some embodiments, this can include interpreting the PUCCH resource indication field in accordance with the downlink DCI message. The interpretation can depend on at least one of a scheduled downlink grant and/or a CSI request in the downlink DCI message. Wireless device 102 can subsequently transmit uplink control information in the determined uplink control resource(s) (step 404).

Figure 5:
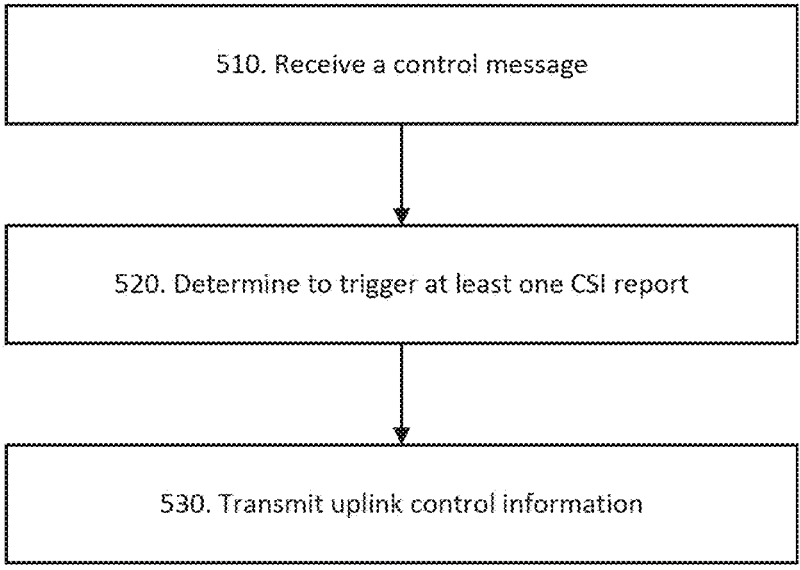
FIG. 5 is a flow chart illustrating an example method performed in a wireless device.

FIG. 5 is a flow chart illustrating a method which can be performed in a wireless device, such as UE 102. The method can include:

Step 510: Receiving a control message. The control message can be a downlink-related DCI message. The control message can be received from an access node, such as gNB 104. The control message can be received on the PDCCH.

In some embodiments, the control message can include a first information indicating whether to trigger at least one CSI report. The first information can be a CSI request field. In some embodiments, the control message can include a second information indicating at least one UL control resource. The second information can be a PUCCH resource indicator field. The second information can indicate at least one PUCCH resource to be used for CSI report/feedback. The control message can further include grant/scheduling information associated with a downlink transmission. In some embodiments, the downlink transmission can be a PDSCH transmission.

Step 520: Determining to trigger at least one CSI report in accordance with the received control message. In some embodiments, this can include determining to trigger the CSI report(s) in accordance with the first information (CSI request field in the downlink-related DCI message). In some embodiments, this can further include determining one or more uplink control resources (e.g. PUCCH resources) in accordance with the second information (PUCCH resource indicator in the downlink-related DCI message). Determining the uplink control resource(s) can be further in accordance with at least one of the first information and/or the grant/scheduling information associated with a downlink transmission.

In some embodiments, the uplink control resource(s) are determined in accordance with whether the first information triggers a CSI report(s), or not. In some embodiments, the uplink control resource(s) are determined in accordance with whether a downlink transmission is scheduled, or not. For example, determining the uplink control resource can include determining a first PUCCH resource responsive to a CSI request being indicated in the downlink-related DCI message. In another example, determining the uplink control resource can include determining a second PUCCH resource responsive to a CSI request being not indicated in the downlink-related DCI message. In some embodiments the first PUCCH resource is different from the second PUUCH resource. In another example, determining the uplink control resource can include determining at least a third PUCCH resource responsive to both a CSI request being indicated and a downlink grant being included in the downlink DCI message. In some embodiments the third PUCCH resource is different from the first and second PUCCH resources.

Step 530: Transmitting uplink control information. The uplink control information can be transmitted in the determined at least one uplink control resource (e.g. PUCCH resource). The uplink control information can be transmitted to an access node, such as gNB 104). The transmitted uplink control information can include at least one of a HARQ-ACK and/or a CSI report. In some embodiments, a CSI report can be multiplexed with a HARQ-ACK on the determined uplink control resource. In some embodiments, the CSI report and the HARQ-ACK can be transmitted on different PUCCH resources. In some embodiments, the HARQ-ACK can be scheduled by the downlink-related DCI and the HARQ-ACK resource can be determined in accordance with the PUCCH resource indicator.

In some embodiments, the method of FIG. 5 can further include obtaining, by the wireless device, configuration information associated with interpreting the CSI request field and/or the PUCCH resource indicator. In some embodiments, the wireless device can obtain the configuration information prior to receiving the DL-related DCI message. This can include obtaining, by higher layer signaling, a first information mapping a first bitfield in a downlink control message to triggering of one or more CSI reports; and obtaining, by higher layer signaling, a second information mapping a second bitfield in a downlink control message to an indication of one or more uplink control resource(s). Accordingly, the wireless device can interpret a received DL-related DCI message in accordance with the obtained configuration information.

It will be appreciated that one or more of the above steps can be performed simultaneously and/or in a different order. Also, steps illustrated in dashed lines are optional and can be omitted in some embodiments.

Figure 6:
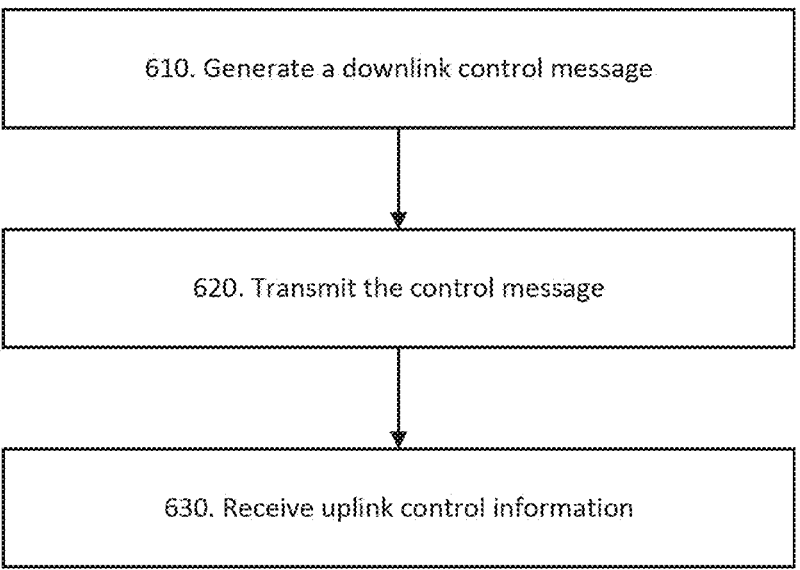
FIG. 6 is a flow chart illustrating an example method performed in a network node.

FIG. 6 is a flow chart illustrating a method which can be performed in a network node, such as access node 104. The method can include:

Step 610: Generating a downlink control message. In some embodiments, the control message can be a DL-related DCI message. Generating the control message can include generating/configuring parameters including a CSI request field and/or a PUCCH resource indicator field. The CSI request field can indicate whether to trigger CSI feedback on the PUCCH. The control message can further include a grant to schedule a PDSCH transmission.

In some embodiments, the PUCCH resource indicator can include at least a first field indicating a first PUCCH resource to use when a CSI report is requested/triggered by the control message, and a second field indicating a second PUCCH resource to use when a CSI report is not requested/not triggered by the control message. In some embodiments, the PUCCH resource indicator can include a third field indicating at least a third PUCCH resource to use when both a CSI report is request and a downlink grant is included by the control message.

Step 620: Transmitting the generated control message. In some embodiments this includes transmitting, on a PDCCH, the generated downlink-related DCI message.

Step 630: Receiving uplink control information. The uplink control information can include at least one CSI report. The uplink control information can be received on a PUCCH resource in accordance with the generated downlink control message.

It will be appreciated that one or more of the above steps can be performed simultaneously and/or in a different order. Also, steps illustrated in dashed lines are optional and can be omitted in some embodiments.

Figure 7:
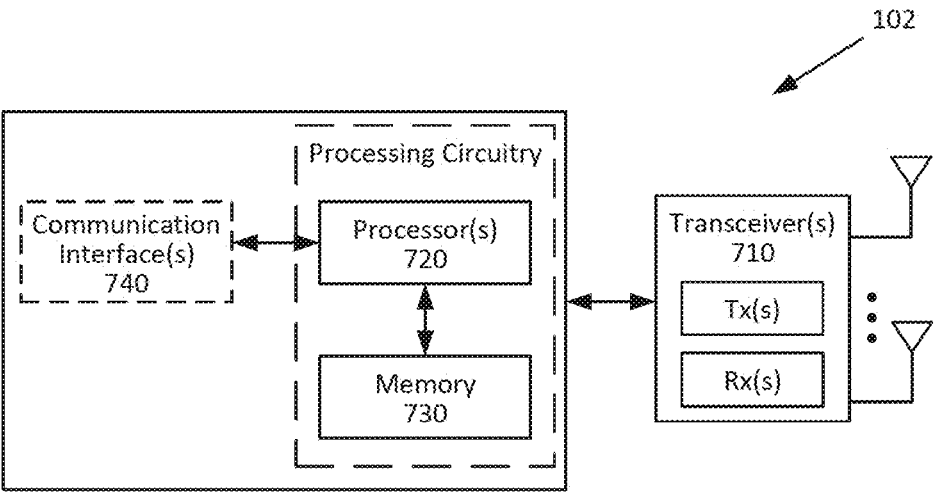
FIG. 7 is a block diagram of an example wireless device.

FIG. 7 is a block diagram of an example wireless device, UE 102, in accordance with certain embodiments. UE 102 includes a transceiver 710, processor 720, and memory 730. In some embodiments, the transceiver 710 facilitates transmitting wireless signals to and receiving wireless signals from radio access node 104 (e.g., via transmitter(s) (Tx), receiver(s) (Rx) and antenna(s)). The processor 720 executes instructions to provide some or all of the functionalities described above as being provided by UE, and the memory 730 stores the instructions executed by the processor 720. In some embodiments, the processor 720 and the memory 730 form processing circuitry.

The processor 720 may include any suitable combination of hardware to execute instructions and manipulate data to perform some or all of the described functions of UE 102, such as the functions of UE 102 described above. In some embodiments, the processor 720 may include, for example, one or more computers, one or more central processing units (CPUs), one or more microprocessors, one or more application specific integrated circuits (ASICs), one or more field programmable gate arrays (FPGAs) and/or other logic.

The memory 730 is generally operable to store instructions, such as a computer program, software, an application including one or more of logic, rules, algorithms, code, tables, etc. and/or other instructions capable of being executed by a processor 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by the processor 720 of UE 102.

In some embodiments, communication interface 740 is communicatively coupled to the processor 720 and may refer to any suitable device operable to receive input for network node 104, send output from network node 104, perform suitable processing of the input or output or both, communicate to other devices, or any combination of the preceding. The communication interface 740 may include appropriate hardware (e.g., port, modem, network interface card, etc.) and software, including protocol conversion and data processing capabilities, to communicate through a network.

Other embodiments of UE 102 may include additional components beyond those shown in FIG. 7 that may be responsible for providing certain aspects of the UE's functionalities, including any of the functionalities described above and/or any additional functionalities (including any functionality necessary to support the solution described above). As just one example, UE 102 may include input devices and circuits, output devices, and one or more synchronization units or circuits, which may be part of the processor. Input devices include mechanisms for entry of data into UE 102. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
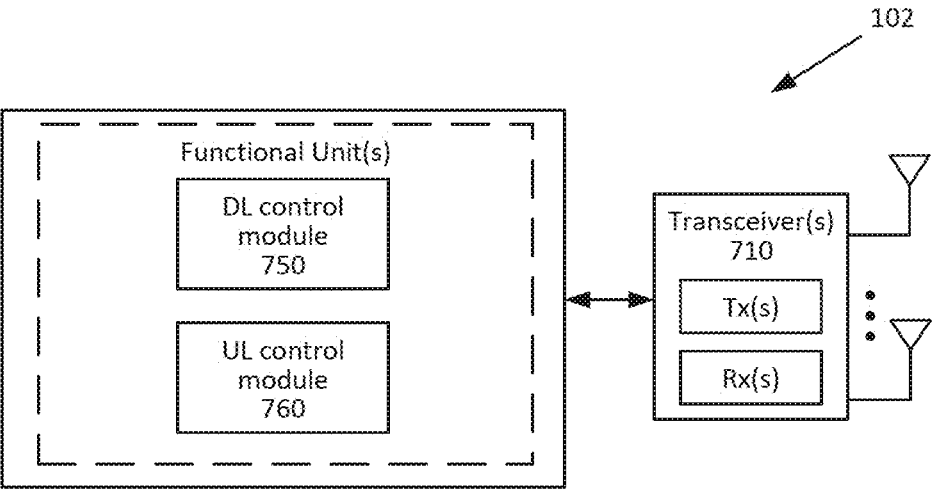
FIG. 8 is a block diagram of an example wireless device with modules.

In some embodiments, the UE 102 can comprise a series of functional units or modules configured to implement the functionalities of the UE described above. Referring to FIG. 8, in some embodiments, the UE 102 can comprise a downlink control module 750 for receiving a downlink control message and for processing said control message, and an uplink control module 760 for determining an uplink control resource and for transmitting uplink control information.

It will be appreciated that the various modules may be implemented as combination of hardware and software, for instance, the processor, memory and transceiver(s) of UE 102 shown in FIG. 7. Some embodiments may also include additional modules to support additional and/or optional functionalities.

Figure 9:
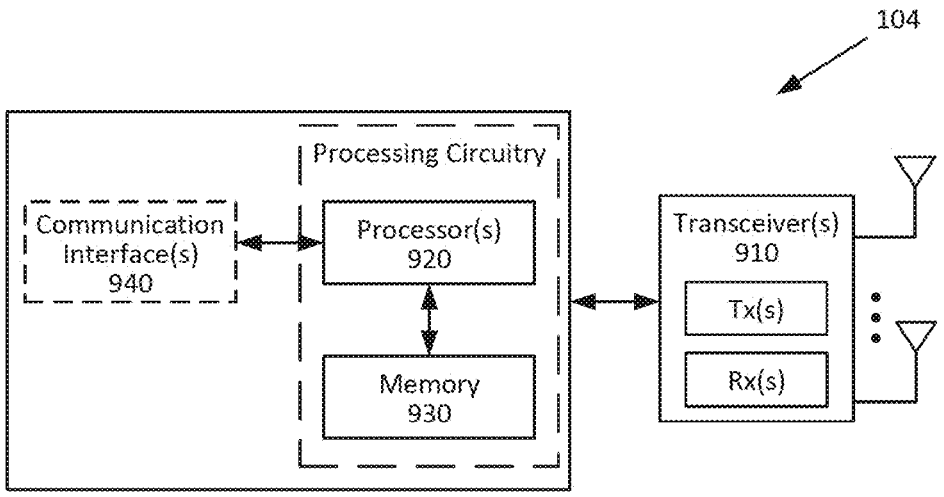
FIG. 9 is a block diagram of an example network node.

FIG. 9 is a block diagram of an example network node, e.g. access node 104, in accordance with certain embodiments. Access node 104 may include one or more of a transceiver 910, processor 920, memory 930, and network interface 940. In some embodiments, the transceiver 910 facilitates transmitting wireless signals to and receiving wireless signals from UE 102 (e.g., via transmitter(s) (Tx), receiver(s) (Rx), and antenna(s)). The processor 920 executes instructions to provide some or all of the functionalities described above as being provided by an access node 104, the memory 930 stores the instructions executed by the processor 920. In some embodiments, the processor 920 and the memory 930 form processing circuitry. The network interface 940 communicates signals to backend network components, such as a gateway, switch, router, Internet, Public Switched Telephone Network (PSTN), core network nodes or radio network controllers, etc.

The processor 920 may include any suitable combination of hardware to execute instructions and manipulate data to perform some or all of the described functions of access node 104, such as those described above. In some embodiments, the processor 920 may include, for example, one or more computers, one or more central processing units (CPUs), one or more microprocessors, one or more application specific integrated circuits (ASICs), one or more field programmable gate arrays (FPGAs) and/or other logic.

The memory 930 is generally operable to store instructions, such as a computer program, software, an application including one or more of logic, rules, algorithms, code, tables, etc. and/or other instructions capable of being executed by a processor 920. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 940 is communicatively coupled to the processor 920 and may refer to any suitable device operable to receive input for access node 104, send output from access node 104, perform suitable processing of the input or output or both, communicate to other devices, or any combination of the preceding. The network interface 940 may include appropriate hardware (e.g., port, modem, network interface card, etc.) and software, including protocol conversion and data processing capabilities, to communicate through a network.

Other embodiments of access node 104 may include additional components beyond those shown in FIG. 9 that may be responsible for providing certain aspects of the access node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 10:
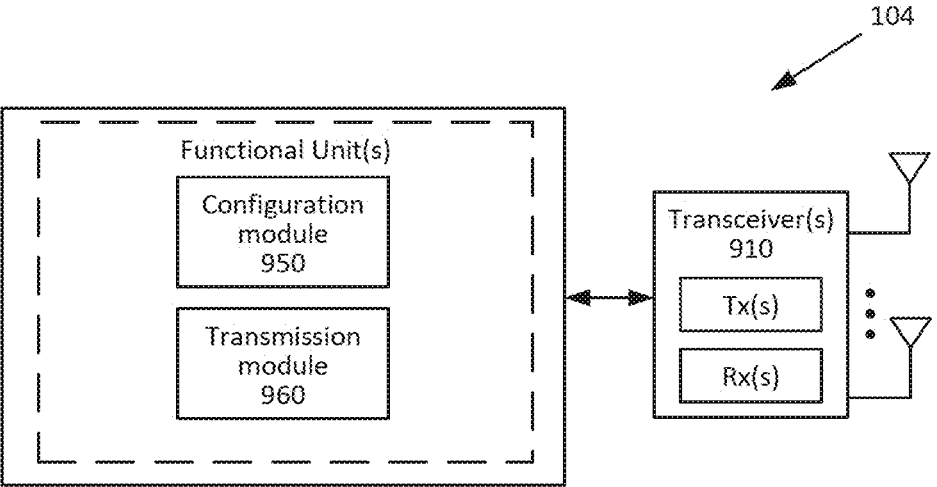
FIG. 10 is a block diagram of an example network node with modules.

In some embodiments, the network node 104, which can be, for example, a radio access node, may comprise a series of modules configured to implement the functionalities of the network node 104 described above. Referring to FIG. 10, in some embodiments, the network node 104 can comprise a configuration module 950 for generating a downlink control message and a transmission module 960 for transmitting said generated control message.

It will be appreciated that the various modules may be implemented as combination of hardware and software, for instance, the processor, memory and transceiver(s) of network node 120 shown in FIG. 9. Some embodiments may also include additional modules to support additional and/or optional functionalities.

Processors, interfaces, and memory similar to those described with respect to FIGS. 7 and 9 may be included in other network nodes (such as core network node 106). Other network nodes may optionally include or not include a wireless interface (such as the transceiver described in FIGS. 7 and 9).

Example Standardization Scenario

It was agreed to support aperiodic CSI reporting on short PUCCH in RAN1 #90-AH3. One motivation for this is to allow for more scheduling flexibility, even WB CSIs can be triggered aperiodically and it can be wasteful to spend an entire PUSCH transmission (spanning multiple OFDM symbols) if only transmitting a couple of 10 bits of WB CSI. Another motivation is to allow for same-slot CSI feedback (i.e. Y=0).

An A-CSI report must be triggered with DCI by indicating which CSI report(s) shall be reported in the CSI request field. Conventionally, the CSI request field is present in UL-related DCI, as the CSI report in that case is multiplexed with UL-SCH on PUSCH and the UL-related DCI contains the PUSCH RA. However, when the A-CSI report is transmitted on PUCCH, it may be appropriate to include a CSI request field in the DL-related DCI. Firstly, for the case same-slot CSI reporting (Y=0), the UE is likely being scheduled with PDSCH in the same slot as it is triggered with an immediate CSI report (otherwise, there is little benefit with immediate reporting). Thus, if the CSI request field is not present in the DL-related DCI containing the DL grant, both a UL-related and DL-related DCI would need to be transmitted in the same slot. Secondly, the DL-related DCI already contains a PUCCH resource indicator field for HARQ-ACK, indicating the timing offset and frequency/code location of the PUCCH containing ACK/NACK. This field can be re-used for indicating the PUCCH resource for A-CSI.

Observation 1: Triggering of A-CSI on PUCCH can be Done with DL-Related DCI

One approach would be to always piggyback the A-CSI report on the same PUCCH that is used to transmit the HARQ-ACK. However, this would limit the flexibility for the gNB. It can also be wasteful in terms of UL resources. As HARQ-ACK is only a few bits, while WB CSI can be on the order of 20 bits, different frequency-allocations and/or PUCCH formats could be required depending on if "HARQ-ACK only" or "HARQ-ACK+CSI" are multiplexed in the PUCCH. Furthermore, it could potentially be beneficial to transmit the HARQ-ACK and CSI that was triggered with the same DCI on different PUCCH resources. For instance, a CSI report with many antenna ports could be triggered, requiring some CSI processing delay by the UE so that the CSI report is transmitted in e.g. slot n+2, while the ACK/NACK could be transmitted in slot n. Thus, different PUCCH timing offsets would need to be indicated. Such flexibility can be introduced without increasing DCI overhead. The PUCCH resource indicator field can simply be interpreted differently depending on the presence of DL grant and/or CSI request in the DCI. This is illustrated in Table 4 above. In this example, if bits 00 are indicated, PUCCH resource #1 is used if the DCI contains DL grant only and not a CSI request while PUCCH resource #3 is used if DCI contains CSI request only and no DL grant. If DCI contains both DL grant and CSI request, PUCCH resource #7 is used. Further in the example, if bits 10 are indicated, PUCCH resource #3 is used for HARQ-ACK and PUCCH resource #2 is used for CSI, if both are triggered simultaneously, separate PUCCH resources are used for the respective transmissions.

Proposal 1: To support aperiodic CSI feedback on PUCCH, a CSI request field can be configured to be present in DL-related DCI.

PUCCH resource indicator field in DL-related DCI indicates PUCCH resource for the triggered CSI report The field is interpreted differently depending on if DCI contains DL grant only, CSI request only, or both Both bundling of HARQ-ACK and CSI in same PUCCH as well as indication of separate PUCCH is supported In the agreed WF, support of A-CSI on PUCCH for CSI triggering offsets larger than zero was left as a working assumption. It should be noted that Y=0 is the most difficult case for a UE to handle, as it requires fast CSI calculation. Since the mechanisms for A-CSI on PUCCH is introduced in the spec regardless, limiting its support to only Y=0 seems like a very artificial restriction. Therefore, we propose:

Proposal 2: Confirm the Working Assumption to Support A-CSI on PUCCH for Y>0

The agreement in RAN1 #90-AH3 only added support for A-CSI on short PUCCH. However, the same mechanism could be used to support A-CSI on long PUCCH as well, which could be beneficial for reliability if e.g. CSI and HARQ-ACK is bundled together in a single PUCCH. Furthermore, it increases scheduling flexibility at the gNB.

Proposal 3: Aperiodic CSI Feedback can be Carried on Long PUCCH

In RAN1 #90, it was agreed that SP-CSI potentially could be supported on short PUCCH/long PUCCH/PUSCH, with potential down-selection. In RAN1 #90-AH3 it was agreed that SP-CSI is supported on PUSCH, with LTE SPS-like triggering. Thus, the question remains if SP-CSI is supported on short/long PUCCH as well.

In RAN1 #89-AH2 Qingdao, it was agreed that Type I sub-band CSI can be carried on either one of PUSCH and long PUCCH. Since only WB CSI is supported for periodic CSI feedback, this implies that either A-CSI or SP-CSI (or both) must support being carried on long PUCCH for the agreement to be fulfilled. Furthermore, according to agreement in RAN1 #90-AH3, the use of short or long PUCCH resource for a PUCCH-based CSI report is configured, meaning that either both short/long PUCCH or none of them must be supported for SP-CSI.

In order to keep down the number of reporting modes, we believe that it is sufficient to support SP-CSI on PUSCH and A-CSI on long PUCCH. Therefore, if SP-CSI is supported on PUCCH can be further considered.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

1×RTT CDMA2000 1× Radio Transmission Technology
3GPP Third Generation Partnership Project
5G Fifth Generation
ABS Almost Blank Subframe
ACK Acknowledgement
ADC Analog-to-digital conversion
AGC Automatic gain control
AN Access Network
ANR Automatic neighbor relations
AP Access point
ARQ Automatic Repeat Request
AS Access Stratum
AWGN Additive White Gaussian Noise band
BCCH Broadcast Control Channel
BCH Broadcast Channel
BLER Block error rate
BS Base Station
BSC Base station controller
BTS Base transceiver station
CA Carrier Aggregation
CC Component carrier
CCCH SDU Common Control Channel SDU
CDMA Code Division Multiplexing Access
CG Cell group
CGI Cell Global Identifier
CP Cyclic Prefix
CPICH Ec/No CPICH Received energy per chip divided by the power density in the
CPICH Common Pilot Channel
CQI Channel Quality information
C-RNTI Cell RNTI
CRS Cell-specific Reference Signal
CSG Closed subscriber group
CSI Channel State Information
DAS Distributed antenna system
DC Dual connectivity
DCCH Dedicated Control Channel
DCI Downlink Control Information
DFT Discrete Fourier Transform
DL Downlink
DL-SCH Downlink shared channel
DMRS Demodulation Reference Signal
DRX Discontinuous Reception
DTCH Dedicated Traffic Channel
DTX Discontinuous Transmission
DUT Device Under Test EARFCN Evolved absolute radio frequency channel number
ECCE Enhanced Control Channel Element
ECGI Evolved CGI
E-CID Enhanced Cell-ID (positioning method)
eMBB Enhanced Mobile Broadband
eNB E-UTRAN NodeB or evolved NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
FDM Frequency Division Multiplexing
FFT Fast Fourier transform
GERAN GSM EDGE Radio Access Network
gNB 5G radio base station
GSM Global System for Mobile communication
HARQ Hybrid Automatic Repeat Request
HD-FDD Half duplex FDD
HO Handover
HRPD High Rate Packet Data
HSPA High Speed Packet Access
IE Information Element
LCMS Level of Criticality of the Mobility State
LPP LTE Positioning Protocol
LTE Long-Term Evolution
M2M Machine to Machine
MAC Medium Access Control
MBMS Multimedia Broadcast Multicast Services
MBSFN ABS MBSFN Almost Blank Subframe
MB SFN Multimedia Broadcast multicast service Single Frequency Network
MCG Master cell group
MCS Modulation and coding scheme
MDT Minimization of Drive Tests
MeNB Master eNode B
MIB Master Information Block
MME Mobility Management Entity
MPDCCH MTC Physical Downlink Control Channel
MRTD Maximum Receive Timing Difference
MSC Mobile Switching Center
Msg Message
MSR Multi-standard Radio
MTC Machine Type Communication
NACK Negative acknowledgement
NAS Non-Access Stratum
NDI Next Data Indicator
NPBCH Narrowband Physical Broadcast Channel
NPDCCH Narrowband Physical Downlink Control Channel
NR New Radio
O&M Operation and Maintenance
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel PDSCH Physical Downlink Shared Channel
PDU Protocol Data Unit
PGW Packet Gateway
PHICH Physical HARQ indication channel
PLMN Public Land Mobile Network
PMI Precoder Matrix Indicator
PRACH Physical Random Access Channel
ProSe Proximity Service
PRS Positioning Reference Signal
PSC Primary serving cell
PSCell Primary SCell
PSS Primary Synchronization Signal
PSSS Primary Sidelink Synchronization Signal
PUCCH Physical Uplink Control Channel
PUSCH Physical Uplink Shared Channel
QAM Quadrature Amplitude Modulation
RA Random Access
RACH Random Access Channel
RAN Radio Access Network
RAT Radio Access Technology
RB Resource Block
RF Radio Frequency
RLM Radio Link Management
RNC Radio Network Controller
RNTI Radio Network Temporary Identifier
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SCG Secondary Cell Group
SCH Synchronization Channel
SDU Service Data Unit
SeNB Secondary eNodeB
SFN System Frame/Frequency Number
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
SSS Secondary synchronization signal
SSSS Secondary Sidelink Synchronization Signal
TA Timing Advance
TAG Timing Advance Group
TDD Time Division Duplex
TDM Time Division Multiplexing
TRP Transmission/Reception Point or Transmit/Receive
  Point
TTI Transmission Time Interval
Tx Transmitter
UARFCN UMTS Absolute Radio Frequency Channel
  Number
UE User Equipment
UL Uplink
UMTS Universal Mobile Telecommunication System
URLLC Ultra-Reliable Low Latency Communication UTRA Universal Terrestrial Radio Access
UTRAN Universal Terrestrial Radio Access Network
V2I Vehicle-to-Infrastructure
V2P Vehicle-to-Pedestrian
V2X Vehicle-to-X
WCDMA Wide CDMA
WLAN Wireless Local Area Network

The invention claimed is:

1. A method performed by a wireless device, the method comprising:
   receiving a control message indicating a grant to schedule a Physical Downlink Shared Channel (PDSCH) transmission, the control message including:
      a Physical Uplink Control Channel (PUCCH) resource indicator indicating a resource for both transmitting a Hybrid Automatic Repeat Request Acknowledgement (HARQ-ACK) for the scheduled PDSCH transmission and transmitting a CSI report; and
      a Channel State Information (CSI) request field indicating whether to trigger CSI feedback on the PUCCH;
   determining to trigger a CSI report in accordance with the CSI request field; and
   transmitting the CSI report in accordance with the PUCCH resource indicator.

2. The method of claim 1, wherein the control message is a Downlink Control Information (DCI) message.

3. The method of claim 2, wherein the DCI is a downlink-related DCI message.

4. The method of claim 1, wherein the control message is received on a Physical Downlink Control Channel (PDCCH).

5. The method of claim 1, further comprising, determining a PUCCH resource for the triggered CSI report in accordance with the PUCCH resource indicator indicating the resource for transmitting the HARQ-ACK for the scheduled PDSCH transmission.

6. The method of claim 5, wherein the PUCCH resource is determined further in accordance with the grant to schedule the PDSCH transmission.

7. The method of claim 5, wherein determining the PUCCH resource comprises at least one of:
   determining a first PUCCH resource responsive to a CSI request being indicated in the control message; and
   determining a second PUCCH resource responsive to a CSI request being not indicated in the control message.

8. The method of claim 1, wherein the CSI report is multiplexed with a HARQ-ACK transmission on the determined PUCCH resource.

9. The method of claim 1, wherein the CSI report and a HARQ-ACK transmission are transmitted on different PUCCH resources.

10. A wireless device comprising a radio interface and processing circuitry configured to:
   receive a control message indicating a grant to schedule a Physical Downlink Shared Channel (PDSCH) transmission, the control message including:
      a Physical Uplink Control Channel (PUCCH) resource indicator indicating a resource for both transmitting a Hybrid Automatic Repeat Request Acknowledgement (HARQ-ACK) for the scheduled PDSCH transmission and transmitting a CSI report; and
      a Channel State Information (CSI) request field indicating whether to trigger CSI feedback on the PUCCH;
   determine to trigger a CSI report in accordance with the CSI request field; and transmit the CSI report in accordance with the PUCCH resource indicator.

11. The wireless device of claim 10, wherein the control message is a Downlink Control Information (DCI) message.

12. The wireless device of claim 11, wherein the DCI is a downlink-related DCI message.

13. The wireless device of claim 10, wherein the control message is received on a Physical Downlink Control Channel (PDCCH).

14. The wireless device of claim 10, further configured to determine a PUCCH resource for the triggered CSI report in accordance with the PUCCH resource indicator indicating the resource for transmitting the HARQ-ACK for the scheduled PDSCH transmission.

15. The wireless device of claim 14, wherein the PUCCH resource is determined further in accordance with the grant to schedule the PDSCH transmission.

16. The wireless device of claim 14, wherein determining the PUCCH resource comprises at least one of:

determining a first PUCCH resource responsive to a CSI request being indicated in the control message; and determining a second PUCCH resource responsive to a CSI request being not indicated in the control message.

17. The wireless device of claim 10, wherein the CSI report is multiplexed with a HARQ-ACK transmission on the determined PUCCH resource.

18. The wireless device of claim 10, wherein the CSI report and a HARQ-ACK transmission are transmitted on different PUCCH resources.

19. A method performed by a network node, the method comprising:

transmitting a control message indicating a grant to schedule a Physical Downlink Shared Channel (PDSCH) transmission, the control message including:

a Physical Uplink Control Channel (PUCCH) resource indicator indicating a resource for both transmitting a Hybrid Automatic Repeat Request Acknowledgement (HARQ-ACK) for the scheduled PDSCH transmission and transmitting a CSI report; and a Channel State Information (CSI) request field indicating whether to trigger CSI feedback on the PUCCH; and receiving a CSI report on a PUCCH resource in accordance with the transmitted control message.

20. The method of claim 19, wherein the control message is a Downlink Control Information (DCI) message.

21. The method of claim 19, wherein the control message is transmitted on a Physical Downlink Control Channel (PDCCH).

22. The method of claim 19, wherein the PUCCH resource indicator includes at least a first field indicating a first PUCCH resource to use when a CSI request is indicated in the control message, and a second field indicating a second PUCCH resource to use when a CSI request is not indicated in the control message.

23. The method of claim 22, wherein the PUCCH resource indicator includes a third field indicating at least a third PUCCH resource to use when both the CSI request is indicated and the grant to schedule the PDSCH transmission is included in the downlink DCI message.

* * * * *